United States Patent [19]

Itamura et al.

[11] Patent Number: 5,082,743
[45] Date of Patent: Jan. 21, 1992

[54] RESIN COMPOSITION AND MULTILAYERED STRUCTURE

[75] Inventors: Sumio Itamura; Tohei Moritani, both of Kurashiki, Japan

[73] Assignee: Kuraray Co., Ltd., Kurashiki, Japan

[21] Appl. No.: 586,598

[22] Filed: Sep. 21, 1990

[30] Foreign Application Priority Data

Sep. 29, 1989 [JP] Japan .................. 1-255985

[51] Int. Cl.$^5$ ............ B32B 27/08; B32B 27/28; C08L 29/04
[52] U.S. Cl. .................................. 428/520; 525/57
[58] Field of Search ...................... 525/57; 428/520

[56] References Cited

U.S. PATENT DOCUMENTS 4,349,644  9/1982  Iwanami et al. .................. 525/57

FOREIGN PATENT DOCUMENTS

| | | |
|---|---|---|
| 326827 | 1/1989 | European Pat. Off. |
| 3738215 | 5/1988 | Fed. Rep. of Germany |
| 49-33945 | 3/1974 | Japan |
| 99686 | 9/1974 | Japan |
| 39380 | 4/1978 | Japan |
| 11050 | 1/1982 | Japan |
| 32952 | 2/1982 | Japan |
| 74354 | 5/1983 | Japan |
| 161447 | 8/1985 | Japan |
| 63-230757 | 9/1988 | Japan |

OTHER PUBLICATIONS

Patent Abstracts of Japan, vol. 13, No. 24 (C-561) (3372) Jan. 19, 1989.
Derwent Publications Ltd, London, GB;AN=-76-42498X.

*Primary Examiner*—John C. Bleutge
*Assistant Examiner*—Randy Gulakowski
*Attorney, Agent, or Firm*—Kramer, Brufsky & Cifelli

[57] ABSTRACT

Provided are resin compositions comprising:

(A) 60 to 95% by weight of an ethylene-vinyl acetate copolymer having an ethylene content of 20 to 65 mol % and a saponification degree of vinyl acetate component of at least 96%, (B) 4.5 to 39.5% by weight of an ethylene-vinyl acetate copolymer having an ethylene content of 60 to 98 mol %, and (C) at least 0.5% by weight of a saponified product of an ethylene-vinyl acetate copolymer having an ethylene content of 68 to 98 mol % and a saponification degree of vinyl acetate component of at least 20%, the incorporation ratio of (C) based on the sum of (B) and (C) being not more than 38% by weight.

The resin compositions of the present invention have markedly improved flexibility without deteriorating transparency and gas barrier properties as compared with conventional saponified products of ethylene-vinyl acetate copolymers. Multilayered structures comprising at least one layer of the composition have excellent resistance to falling shock, flexural resistance, prevention of air-back, skin-pack adaptability and shrink-packaging capability and can hence of great value for packaging various goods.

2 Claims, No Drawings

RESIN COMPOSITION AND MULTILAYERED STRUCTURE

BACKGROUND OF THE INVENTION

1. Field of the Invention

The present invention relates to resin compositions being excellent in gas barrier properties and improved in flexibility, represented by resistance to falling shock, flexural resistance, air-back prevention, skin-pack adaptability, shrink-film packagability and in transparency, and also to multilayered structures comprising at least one layer of said composition.

2. Description of the Prior Art

Saponified product of ethylene-vinyl acetate copolymer (hereinafter referred to as EVOH) is a thermoplastic resin excellent in gas barrier properties, resistance to oil and odor keeping property as compared with other resins and is used for gas-barrier layer for various gas-barrier films and gas-barrier containers. However, multilayered films and multilayered containers comprising EVOH as gas-barrier layer often encounter problems resulting from high rigidity of the EVOH. For example, multilayered films and containers filled with contents often break or destroy when dropped onto the ground, pinholes readily generate on multilayered films filled with contents due to bending or vibration during transportation, air-back tends to generate on multilayered tubes, creases generate upon skin-packing, insufficient stretchability and shrinkage of shrink-packing films, and so forth.

Blending EVOH with other thermoplastic resins or plasticizers to improve these drawbacks has been proposed. For example, there are currently employed a process which comprises blending EVOH with a plasticizer such as butylene glycol or dioctyl phthalate and a process which comprises blending EVOH with an ethylene-vinyl acetate copolymer, ethylene-vinyl carboxylate copolymer, ethylene-acrylic acid ester copolymer, ethylene-vinyl carboxylate copolymer modified with an α,β-unsaturated carboxylic acid or its anhydride or the like. However, the blending of plasticizers has drawbacks of bleeding of the plasticizers and low mechanical properties of the resulting molded articles, and the blending of the above copolymers impairs, while exhibiting a large effect of increasing flexibility and resistance to shock, the transparency that is a specific feature of EVOH.

Compositions comprising EVOH and polyamide are known to have high transparency, but they have other drawbacks of decreased gas barrier properties and poor thermal stability at molding, thereby forming gels in a short time. The compositions therefore have not been used in practice.

Japanese Patent Publication No. 48512/1976 and Japanese Patent Application Laid-open No. 161447/1985 disclose blending EVOH with a partially saponified product of ethylene-vinyl acetate copolymer (hereinafter referred to as "partially saponified EVA) and that the use of this blend provides interlayer adhesiveness between EVOH and polyolefin and low-temperature heatsealability. However, when molded articles such as film are prepared according to the procedure given in the prior art, there occur problems of low flexibility, poor thermal stability, poor moldability with vigorous neck-in and the like, and further the obtained articles show streaks and pear-skin patterns on the surface, and the process has not yet been put into practice.

The Japanese Patent Publication No. 48512/1976 also describes blending EVOH with a partially saponified EVA and further incorporating into the resultant composition an polyolefin (e.g. ethylene-vinyl acetate copolymer) in an amount of not more than 60% by weight based on the total weight of the partially saponified EVH and the polyolefin. However, the incorporation of polyolefin in an amount of 60% by weight leads to formation of streaks and pear-skin patterns on the surface of the molded film, which is not preferred. This fact is clear from Comparative Example 5 later described herein.

Japanese Patent Application Laid-open Nos. 11050/1982 and 32952/1982 disclose blending EVOH with a partially saponified EVA and blending the resultant composition with an ethylene-vinyl acetate copolymer in an weight ratio of not more than that of the partially saponified EVA, to obtain a multilayered container having excellent adhesiveness between polyolefin layer or polyvinyl chloride layer. However, the incorporation of an ethylene-vinyl acetate copolymer in an weight ratio of not more than that of a partially saponified EVA contained creates streaks and pear-skin pattern on the film surface, which is not preferred. This fact is also clear from Comparative Example 5 later described herein.

EP-A 326827 discloses blending EVOH with a partially saponified EVA, but it does not describe about further incorporation of an ethylene-vinyl acetate copolymer.

Japanese Patent Application Laid-open No. 39380/1978 discloses blending 100 parts by weight of a polyolefin (e.g. ethylene-vinyl acetate copolymer) with 5 to 40 parts by weight of a partially saponified EVA, to obtain a laminate having excellent adhesiveness between the composition layer and a polyolefin layer. However, this large amount of polyolefin incorporated will not give a laminate having excellent gas barrier property. This is clear from Comparative Example 7 later described herein.

Japanese Patent Application Laid-open No. 74354/1983 discloses lamination of a laminate of a polyethylene (PE) layer with a layer of a blend comprising 10 to 100 wt % of EVOH, 0 to 85 wt % of EVA and 0 to 90 wt % of partially saponified EVA, the PE layer of which has been treated with ozone, with an anchor-treated base layer; and, in the Example, the use of a blend comprising 31 wt % of EVOH, 65 wt % of EVA and 9 wt % of partially saponified EVH. However, this application only describes the blend of the above composition as being best for transparency, and does not describe the teaching that blending of the above three components in specific amounts can minimize generation of streaks and pear-skin patterns of the resulting molded articles. Besides, with the blend having the composition described in the Example of this application, the molded articles will have pear-skin patterns on the surface thereof and poor gas barrier properties, as shown in the Comparative Example 6 which is described later herein.

As stated heretofore, there has not been obtained a resin composition or multilayered structure comprising EVOH and having well-balanced properties of resistance to falling shock, flexural resistance, prevention of air-back, skin-pack adaptability, shrink-pack capability and the like.

SUMMARY OF THE INVENTION

Accordingly, an object of the present invention is to provide a resin composition and multilayered structure comprising EVOH and having flexibility represented by resistance to falling shock, flexural resistance, prevention of air-back, skin-pack adaptability, shrink-pack capability and the like without deteriorating the transparency and gas barrier property inherent to EVOH.

The present inventors have found that a resin composition, or multilayered structure molded therefrom, having flexibility represented by resistance to falling shock, flexural resistance, prevention of air-back, skin-pack adaptability, shrink-pack capability and the like without deteriorating the transparency and gas barrier property inherent to EVOH can be obtained by blending EVOH (A) with an ethylene-vinyl acetate copolymer (hereinafter referred to as EVA) (B) and a specific saponified product of an ethylene-vinyl acetate copolymer (C) having a saponification degree of vinyl acetate component of at least 20% and an ethylene content of 68 to 98 mol % (hereinafter referred to as S-EVOH), and completed the invention.

DETAILED DESCRIPTION OF THE PREFERRED EMBODIMENTS

The EVOH (A) used in the present invention includes any ethylene-vinyl acetate copolymer with its vinyl acetate component hydrolyzed but, those having poor compatibility with EVA have relatively low ethylene content and high degree of saponification (hydrolysis) of vinyl acetate component. Particularly, EVOH's having an ethylene content of 20 to 65 mol % and a saponification degree of vinyl acetate content of at least 96%, more particularly at least 99% are especially important as the object of the present invention, since they give, when used in combination with EVA, superior containers.

The EVOH (A) herein may be modified with not more than 5 mol % of a copolymerizable monomer. Examples of the modifying monomer include propylene, 1-butene, 1-hexene, 4-methyl-1-pentene, acrylic acid esters, methacrylic acid esters, maleic acid, fumaric acid, itaconic acid, vinyl esters of higher fatty acids, alkyl vinyl ethers, N-(2-dimethylaminoethyl)methacrylamide or quaternary compounds thereof, N-vinylimidazole or quaternary compounds thereof, N-vinylpyrrolidone, N,N-butoxymethylacrylamide, vinyltrimethoxysilane, vinylmethyldimethoxysilane and vinyldimethylmethoxysilane.

The melt flow index (MI) (measured under conditions of 190° C. and 2160 g load) of the EVOH (A) is preferably at least 0.1 g/10 min, more preferably at least 0.5 g/10 min, and preferably 100 g/10 min at most, more preferably 50 g/10 min at most, most preferably 30 g/10 min at most.

The EVA (B) used in the present invention includes, besides random copolymers of ethylene and vinyl acetate, modified ethylene-vinyl acetate copolymers such as the above random copolymers having introduced functional groups and 3-element copolymers derived from ethylene, vinyl acetate and other monomers. It is important that the EVA have an ethylene content of 60 to 98 mol %, preferably 70 to 90 mol %. If the ethylene content exceeds 98 mol %, the flexibility and transparency, which are characteristic to EVA, will be impaired. On the other hand, if the ethylene content is less than 60 mol %, the film strength will become significantly low, which is not preferred for practical purposes. The melt flow index (MI) (measured under conditions of 190° C. and 2160 g load) of the EVA (B) is preferably at least 0.5 g/10 min, more preferably at least 0.8 g/10 min, and preferably 50 g/10 min at most, more preferably 30 g/10 min at most, most preferably 20 g/10 min at most.

The S-EVOH (C) is, in the present invention, a specific EVOH suitably selected and newly developed for the purpose of significantly improving compatibility between the EVOH (A) and EVA (B), and is a saponified product of an ethylene-vinyl acetate copolymer having an ethylene content of 68 to 98 mol % and a saponification degree of vinyl acetate component of at least 20%. Those particularly effective in improving the compatibility have an ethylene content of at least 70 mol %, and 96 mol % at most, more preferably 94 mol % at most, and a saponification degree of vinyl acetate component of at least 30%, more preferably at least 40%. The upper limit of the saponification degree is not specifically restricted and a saponification degree of substantially 100% can also be used.

An EVA having an ethylene content of less than 68 mol % or more than 98 mol %, or a saponification degree of vinyl acetate componet of less than 20% causes flow instability to give molded articles with poor appearance. The ethylene content of S-EVOH (C) is preferably at least 5 mol % higher, more preferably at least 10 mol % higher than that of EVA (B). The melt flow index (MI) of the S-EVOH (C) is preferably at least 0.1 g/10 min, more preferably at least 0.5 g/10 min, and preferably 100 g/10 min at most, more preferably 50 g/10 min at most, most preferably 30 g/10 min at most.

The S-EVOH (C) used in the present invention may be modified with an unsaturated carboxylic acid or derivatives thereof. The modifying acid monomer is $\alpha,\beta$-unsaturated carboxylic acid, or esters or anhydrides thereof, and examples of the foregoing includes acrylic acid, methacrylic acid, maleic acid, fumaric acid, itaconic acid, maleic acid, fumaric acid, mono- or dimethyl and -ethyl esters of these acids, maleic anhydride and itaconic anhydride. These acid monomers may be used singly or in combination.

The blending ratio of EVOH (A) is 60 to 95% by weight, preferably 65 to 92% by weight, while that of EVA (B) is 4.5 to 39.5% by weight, preferably 7 to 32% by weight and that of S-EVOH (C) is at least 0.5% by weight, preferably at least 1.0% by weight, with the ratio of (C) to the sum of (B) and (C) being not more than 38% by weight, preferably not more than 35% by weight.

If the ratio of EVOH (A) blended is less than 60% by weight, the gas barrier property will be insufficient, while on the other hand the ratio exceeding 95% does not produce, by the blending, effects of improving resistance to falling shock, flexural resistance, prevention of air-back, skin-pack adaptability, shrink-pack capability and the like.

If the amount of S-EVOH (C) blended is less than 0.5% by weight, the effect of improving the compatibility between EVOH (A) and EVA (B) will not be produced. If the ratio of S-EVOH (C) to the sum of (B) and (C) exceeds 38% by weight, streaks and pear-skin pattern will form on the film surface.

This composition may further incorporate salts or oxides containing at least one element selected from Groups I, II and III of the periodic table, which are disclosed in U.S. Pat. No. 4,613,644. The composition may also incorporate known additives, including antioxidants, ultraviolet absorbers, plasticizers, static eliminators, slipping agents, colors, fillers and other polymeric substances, which are added within limits not to impair the effect and function of the present invention. Concrete examples of the additives are as follows.

Antioxidant: 2,5-di-t-butylhydroquinone, 2,6-di-t-butyl-p-cresol, 4,4'-thiobis-(6-t-butylphenol), 2,2'-methylene-bis-(4-methyl-6-t-butylphenol), octadecyl-3-(3',5'-di-t-butyl-4'-hydroxyphenyl) propionate and 4,4'-thiobis-(6-t-butylphenol).

Ultraviolet absorber: ethylene-2-cyano-3,3-diphenyl acrylate, 2-(2'-hydroxy-5'-methylphenyl)benzotriazole, 2-(2'-hydroxy-3'-t-butyl-5'-methylphenyl)5-chlorobenzotriazole, 2-hydroxy-4-methoxybenzophenone, 2,2-dihydroxy-4-methoxybenzophenone and 2-hydroxyoctoxybenzophenone.

Plasticizer: dimethyl phthalate, diethyl phthalate, dioctyl phthalate, wax, liquid paraffine and phosphoric acid esters.

Static eliminator: pentaerythrit monostearate, sorbitan monopalmitate, polyolefins modified with sulfuric acid, polyethylene oxide and carbowax.

Slipping agent: ethylenebisstearoamid and butyl stearate.

Color: carbon black, phthalocyanine, quinacrydone, indolin, azo pigments, red ocher and titanium dioxide.

Filler: glass fiber, asbestos, wollastonite, calcium silicate, aluminum silicate, calcium carbonate, mica and phosphoric acid anhydride.

The components are incorporated by using ribbon blender, high-speed mixer-cokneader, mixing roll, extruder, intensive mixer, or the like, to give the compositions of the present invention.

The resin compositions of the present invention can be molded into desired articles such as films, sheets, tubes, bottles, cups and the like through known melt extrusion molding machine, compression molding machine, transfer molding machine, injection molding machine, blow molding machine, heat molding machine, rotary molding machine, dipping molding machine and the like. The extrusion temperature for molding is suitably selected depending on the types, molecular weights and incorporation ratio of component resins, type of extruder and the like, and is generally in a range of from 170° to 350° C.

Where the resin compositions of the present invention are used as a layer of a multilayered structure, the multilayered structure may assume any layer construction. Suitable layers other than the layer of the resin composition of the present invention are thermoplastic resin layer and adhesive resin layer.

Representative thermoplastic resin are polyolefins including high, medium and low density polyethylenes, polyethylene copolymerized with an α-olefin such as butene, hexene or 4-methyl-1-pentene, ionomer resins, polypropylene homopolymer, polypropylenes graft-copolymerized with ethylene, polypropylenes copolymerized with an α-olefin such as ethylene, butene, hexene or 4-methyl-1-pentene; modified polypropylenes blended with rubber-related polymers; poly-1-butene; poly-4-methyl-1-pentene; modified polyolefins obtained by reacting the foregoing polyolefins with maleic anhydride; and the like.

Examples of the thermoplastic resins other than the above-mentioned polyolefins are polyamide resins, polyester resins, polystyrene resins, polyvinyl chloride resins, acrylic resins, polyvinylidene chloride resin, polyurethane resins, polyvinyl acetate resin, polyacetal resins and polycarbonate resins.

Suitable adhesive resins are polyolefins modified with an unsaturated carboxylic acid or derivatives thereof. These modified polyolefin resins include polyolefins modified with at least one member selected from the group consisting of unsaturated carboxylic acids, such as acrylic acid, methacrylic acid, maleic acid, fumaric acid, crotonic acid, itaconic acid and citraconic acid, and esters and anhydrides of the foregoing, and derivatives of unsaturated carboxylic acids, such as methyl acrylate, methyl methacrylate, ethyl acrylate, propyl acrylate, butyl acrylate, butyl methacrylate, vinyl acetate, glycidyl acrylate, glycidyl methacrylate, acrylamide, methacrylamide, sodium acrylate and sodium methacrylate; or with derivatives of the foregoing. Compositions comprising these polyolefins are also included herein. Suitable examples of the polyolefins to be modified are polyethylene, polypropylene, ethylene-vinyl acetate copolymer and ethylene-acrylate copolymer.

Suitable examples of the multilayered structures have the following layer constructions, where the resin composition of the present invention, thermoplastic resin, EVOH and adhesive resin are represented by D, E and AD, respectively.

2 layers: E/D
3 layers: E/AD/D, E/D/E, D/E/D
4 layers: E/D/AD/E, E/D/AD/D
5 layers: E/AD/D/AD/E.

The multilayered structures having the above layer constructions are, since they comprise EVOH that has excellent gas barrier property, useful for packaging food and medical articles such as medicines and medical utensils, which require high gas barrier packaging. Particularly preferred multilayered structures are those comprising at least one layer of thermoplastic resin (D), in view of their high gas barrier property.

For forming multilayered structures, generally speaking the best process is what is known as co-extrusion molding, which comprises using separate extruders in a number corresponding to the number of types of resin layers and simultaneously co-extruding the plurality of melts, laminated one upon another, of the resins melted in the extruders. Also available are extrusion coating, dry lamination and like multi-layer formation processes.

Molded articles from the resin composition of the present invention only, or multilayered structures comprising the resin composition of the present invention can further be stretched by monoaxial stretching, biaxial stretching, blow stretching or the like, to give molded articles having still distinctive characteristics in mechanical properties, gas barrier properties and the like. Accordingly, molded articles obtained from the resin compositions of the present invention have not only, the blend composition being uniform, neat appearance with the blend, but various excellent characteristics such as strength properties and gas barrier properties, because of uniformity due to high compatibility among components, and hence have industrially great significance.

Other features of the invention will become apparent in the course of the following descriptions of exemplary embodiments which are given for illustration of the invention and are not intended to be limiting thereof. In the Examples, "parts" means "parts by weight".

EXAMPLES

EXAMPLE 1

Dry blending was conducted with 70 parts by weight of an EVOH having an ethylene content of 44 mol %, a saponification degree of vinyl acetate component of 99% and a melt flow index (MI) measured according to ASTM D1238 65T at 190° C. and under 2160 g load of 5.5 g/10 min, 25 parts by weight of an ethylene-vinyl acetate copolymer having an ethylene content of 86 mol % and an MI of 6.0 g/10 min and 5 parts by weight of an S-EVOH having an ethylene content of 89 mol %, a saponification degree of vinyl acetate component of 91% and an MI of 5.3 g/10 min, and the blend obtained was blend pelletized through a 30-φ different-direction twinscrew extruder at 220° C. The pellets thus obtained were fed to an extruder with a full flight type screw having a diameter of 40 mm, an L/D of 24 and a compression ratio of 3.8 and formed into a single-layer film having a thickness of 25μ through a flat die having a width of 550 mm. The film thus obtained was evaluated for surface appearance, moldability, haze, loop stiffness, flexural resistance, Young's modulus and oxygen gas transmission rate (OTR).

The surface appearance was, pear-skin pattern and gels being checked, visually evaluated and the results were indicated by 5-rank ratings of A through E. The moldability was, neck-in being checked, indicated by 5-rank ratings of A through E. These results are shown in Table 1.

TABLE 1

| Rank | Streaks | Pear-skin pattern | Gel | Neck-in |
|---|---|---|---|---|
| A | No | No | No | No |
| B | Slightly visible | Slightly visible | | |
| C | Visible | Visible | A few | A few |
| D | Many | Many | | |
| E | Film formation impossible | | Many | Many |

Haze was measured with Poic Integrated Sphere light transmission tester made by Nihon Precision Optics Co.

Loop stiffness was measured at 20° C. and 65% RH with a loop stiffness tester made by Toyo Seiki Co. on a film specimen of 15 mm wide folded into a loop of 60 mm long for its repulsive force when compressed to a loop diameter of 20 mm. The loop stiffness is an important property item as a measure for the ability of preventing air-back. Compositions having smaller loop stiffness are thought to be of higher ability to prevent air-back.

Flexural resistance was evaluated using Gelbo Flex Tester made by Rigaku Kogyo Co. as follows. A specimen of 12 in.×8 in. was made round such that its both ends meet to form a cylinder having a diameter of 3.5 inches. Both ends of the thus formed cylinder was held at an initial holding distance of 7 inches and a holding distance when flexed to the maximum of 1 inch. The thus held specimen was subjected to 300 reciprocating motions each consisting of a motion of twisting it to an angle of 440° in the first 3.5 inches of the stroke and the succeeding linear horizontal move of 2.5 inches, at a rate of 40 times/min under conditions of 20° C. and 65% RH. Then the number of pinholes formed on the specimen was counted.

Young's modulus was measured at 20° C., 65% RH according to ASTM D-882-67. This is important as a measure for skin-pack adaptability and shrink-packaging capability. A composition with lower Young's modulus, which can be stretched by smaller force, may be better suited for skin-pack and shrink-film packaging where a stretching process is involved.

Oxygen gas transmission rate (OTR) was determined using OX-TRAN 10-50A at 20° C., 65% RH.

The results of the evaluations are shown in Table 2. The compositions of the present invention were excellent in film appearance, moldability and transparency, as well as flexibility as represented by loop stiffness, flexural resistance and Young's modulus, and in gas barrier property.

EXAMPLES 2 THROUGH 8

Compositions comprising EVOH's, ethylene-vinyl acetate copolymers and S-EVOH's as shown in Table 2 were evaluated in the same manner as in Example 1, to give results as shown. These compositions were also excellent in film appearance, moldability and transparency, as well as flexibility as represented by loop stiffness, flexural resistance and Young's modulus, and in gas barrier property.

COMPARATIVE EXAMPLE 1

An EVOH having an ethylene content of 44 mol %, a saponification degree of vinyl acetate component of 99% and an MI of 5.5 g/10 min was molded through a 40-φ extruder into a film having a thickness of 25μ. The obtained film was evaluated in the same manner as in Example 1 to give the results shown in Table 2. The film showed large values of loop stiffness, flexural resistance (number of pinholes generated) and Young's modulus, proving its poor flexibility.

COMPARATIVE EXAMPLES 2 THROUGH 7

Compositions comprising EVOH's, EVA's and S-EVOH's as shown in Table 2 were evaluated in the same manner as in Example 1, to give the results shown in Table 2.

In Comparative Example 2, the film had a surface showing pear-skin pattern and high value of haze, and was poor in transparency.

In Comparative Example 3, the film had too many streaks to be usable in practice.

In Comparative Example 4, many streaks and pear-skin patterns generated, resulting in a large haze and poor transparency. The OTR was large and the film was thus short of gas barrier property.

In Comparative Example 5, many streaks and pear-skin patterns generated because of the amount of S-EVOH being larger than that of EVA, and the film was not usable for practical purposes.

In Comparative Examples 6 and 7, the OTR was very large and the film was thus short of gas barrier property.

TABLE 2

| | EVOH(A) | | | | EVA(B) | | | S-EVOH(C) | | | | |
|---|---|---|---|---|---|---|---|---|---|---|---|---|
| | | | | | | | | | | | | Blending ratio |
| | Et. content mol % | S.D. % | MI g/ 10 min | Blending ratio wt % | Et. content mol % | MI g/ 10 min | Blending ratio wt % | Et. content mol % | S.D. % | MI g/ 10 min | wt % | wt % (B) ÷ (C) |
| Ex. 1 | 44 | 99 | 5.5 | 70 | 88 | 6.0 | 25 | 89 | 91 | 5.3 | 5 | 16.7 |

TABLE 2-continued

| | | | | | | | | | | | | |
|---|---|---|---|---|---|---|---|---|---|---|---|---|
| Ex. 2 | 44 | 99 | 5.5 | 90 | 86 | 6.0 | 8 | 89 | 91 | 5.3 | 2 | 20.0 |
| Ex. 3 | 44 | 99 | 5.5 | 60 | 88 | 6.0 | 30 | 89 | 91 | 5.3 | 10 | 25.0 |
| Ex. 4 | 29 | 99 | 1.2 | 70 | 89 | 2.0 | 28 | 93 | 23 | 5.0 | 2 | 6.7 |
| Ex. 5 | 32 | 99 | 1.7 | 80 | 89 | 2.0 | 19 | 74 | 82 | 14.0 | 1 | 5.0 |
| Ex. 6 | 44 | 99 | 5.5 | 70 | 86 | 6.0 | 25 | 74 | 82 | 14.0 | 5 | 16.7 |
| Ex. 7 | 44 | 99 | 5.5 | 70 | 86 | 6.0 | 28 | 89 | 91 | 5.3 | 2 | 6.7 |
| Ex. 8 | 44 | 99 | 5.5 | 70 | 86 | 6.0 | 20 | 89 | 91 | 5.3 | 10 | 33.3 |
| Comp. Ex. 1 | 44 | 99 | 5.5 | 100 | — | — | — | — | — | — | — | — |
| Comp. Ex. 2 | 44 | 99 | 5.5 | 70 | 86 | 6.0 | 30 | — | — | — | — | — |
| Comp. Ex. 3 | 44 | 99 | 5.5 | 70 | — | — | — | 89 | 91 | 5.3 | 30 | — |
| Comp. Ex. 4 | 44 | 99 | 5.5 | 50 | 86 | 6.0 | 40 | 89 | 91 | 5.3 | 10 | 20.0 |
| Comp. Ex. 5 | 44 | 99 | 5.5 | 70 | 86 | 6.0 | 10 | 89 | 91 | 5.3 | 20 | 66.6 |
| Comp. Ex. 6 | 32 | 99 | 1.7 | 35 | 80 | 2.0 | 55 | 89 | 91 | 5.3 | 10 | 15.4 |
| Comp. Ex. 7 | 44 | 99 | 5.5 | 29 | 86 | 6.0 | 70 | 89 | 91 | 5.3 | 2 | 2.8 |

| | Film appearance | | | | Film characteristics | | | | |
|---|---|---|---|---|---|---|---|---|---|
| | Streaks | Pearskin | Gels | Moldability | Haze % | Loop stiffness mg | Flex resistance No. of pinholes | Young's modulus kg/mm$^2$ | OTR cc/m$^2$ · day · atm |
| Ex. 1 | A | A | A | A | 4 | 150 | 0 | 80 | 1.9 |
| Ex. 2 | A | A | A | A | 2 | 200 | 0 | 120 | 1.8 |
| Ex. 3 | A | A | A | A | 6 | 60 | 0 | 60 | 2.7 |
| Ex. 4 | A | B | A | A | 8 | 200 | 0 | 110 | 0.5 |
| Ex. 5 | A | B | A | A | 4 | 200 | 0 | 120 | 0.7 |
| Ex. 6 | A | A | A | A | 6 | 160 | 0 | 100 | 1.9 |
| Ex. 7 | A | A | A | A | 8 | 140 | 0 | 80 | 1.9 |
| Ex. 8 | B | A | A | A | 4 | 150 | 0 | 90 | 2.0 |
| Comp. Ex. 1 | A | A | A | A | 2 | 410 | >100 | 200 | 1.7 |
| Comp. Ex. 2 | A | C | A | A | 40 | 140 | 0 | 80 | 2.3 |
| Comp. Ex. 3 | C | A | A | A | 4 | 150 | 0 | 120 | 2.0 |
| Comp. Ex. 4 | B | C | B | B | 60 | 70 | 0 | 80 | 12.6 |
| Comp. Ex. 5 | C | B | A | A | 16 | 150 | 0 | 110 | 2.1 |
| Comp. Ex. 6 | A | C | B | B | 55 | 50 | 0 | 55 | 2000 |
| Comp. Ex. 7 | A | C | B | A | 50 | 30 | 0 | 40 | 3000 |

Et.: Ethylene
VAc: vinyl acetate
S.D.: saponification degree of vinyl acetate component

EXAMPLE 9

A blend was obtained by blend pelletizing through an extruder 70 parts by weight of an EVOH having an ethylene content of 44 mol %, a saponification degree of vinyl acetate component of 99% and an MI of 5.5 g/10 min, 25 parts by weight of ethylene-vinyl acetate copolymer having an ethylene content of 86 mol % and an MI of 6 g/10 min and 5 parts by weight of an S-EVOH having an ethylene content of 89 mol %, a saponification degree of vinyl acetate component of 91% and an MI of 5.3 g/10 min. The blend thus obtained, a linear low density polyethylene comprising a copolymerization component of 4-methyl-1-pentene in an amount of 3.2 mol % and having an MI of 2.1 g/10 min and an adhesive resin comprising a maleic anhydride-modified ethylene-vinyl acetate copolymer containing 20% by weight of vinyl acetate and 0.5% by weight of maleic anhydride were separately fed to 3 extruders and co-extrusion was conducted through a 3-kind/5-layer die to obtain a multilayered film having a total thickness of 85µ consisting of an intermediate layer of this blend having a thickness of 15µ, surface layers of the polyethylene having a thickness of 30µ and provided on both sides of the intermediate layer, and the adhesive resin layers having a thickness of 5µ and interposed between the intermediate layer and the surface layers. The multilayered film thus obtained was subjected to Gelbo Flex test until pinholes were observed on the film. The oxygen gas transmission rate was tested at 20° C., 65% RH at intervals until the generation of pinholes, on the central part of a specimen taken at intervals and flattened to 12 in. × 8 in. The results are shown in Table 3. Almost no change was observed in the values of oxygen transmission rate during the flexural resistance test before generation of pinholes. No pinholes were observed upto 7,000 strokes of the flexural resistance test, and after 7,100 strokes it was found that a pinhole had generated. No delamination was seen between the layers. The film had a haze of 10%, was good in transparency, and had no appreciable streaks or pear-skin pattern.

COMPARATIVE EXAMPLE 8

Example 9 was repeated except that S-EVOH was not used among resins to be blended with EVOH of the intermediate layer. The film obtained was evaluated in the same manner as in Example 9. The results are shown in Table 3. While the flexural resistance test showed a similar good result, the film had a haze of 25%, thus being poor in transparency.

TABLE 3

|  | Flexural resistance No. of strokes | Number of pinholes | OTR cc/m² · day · atm | Haze % |
|---|---|---|---|---|
| Example 9 | 0 | 0 | 1.1 | 10 |
|  | 1000 | 0 | 1.2 |  |
|  | 2000 | 0 | 1.2 |  |
|  | 3000 | 0 | 1.2 |  |
|  | 7000 | 0 | 1.2 |  |
| Comparative Example 8 | 0 | 0 | 1.2 | 25 |
|  | 1000 | 0 | 1.2 |  |
| Example 8 | 0 | 0 | 1.2 | 25 |
|  | 1000 | 0 | 1.2 |  |
|  | 2000 | 0 | 1.2 |  |
|  | 3000 | 0 | 1.2 |  |
|  | 7000 | 0 | 1.2 |  |

EXAMPLE 10

A blend was obtained by blend pelletizing through an extruder 70 parts by weight of an EVOH having an ethylene content of 44 mol %, a saponification degree of vinyl acetate component of 99% and an MI of 5.5 g/10 min, 25 parts by weight of ethylene-vinyl acetate copolymer having an ethylene content of 86 mol % and an MI of 6 g/10 min and 5 parts by weight of an S-EVOH having an ethylene content of 89 mol %, a saponification degree of vinyl acetate component of 91% and an MI of 5.3 g/10 min. The blend thus obtained and a composition comprising a maleic anhydride-modified ethylene-vinyl acetate copolymer containing 20% by weight of vinyl acetate and 0.5% by weight of maleic anhydride were separately fed to 2 extruders and co-extrusion, direct blow molding was conducted through a 2-kind/3-layer die to obtain a multilayered container having a capacity of 10 l consisting of an intermediate layer of this blend having an average thickness of 50μ and outer and inner layers of the composition provided on both sides of the intermediate layer and each having a thickness of 300μ. The container thus obtained was filled with water, and allowed to fall three times from the height of 1 m. The container did not break, thus showing high resistance to falling shock.

COMPARATIVE EXAMPLE 9

Example 10 was repeated except for using only the EVOH for the intermediate layer, to obtain a container, which was then tested for falling shock resistance in the same manner. The container broke at the first falling.

EXAMPLE 11

A blend was obtained by blend pelletizing through an extruder 70 parts by weight of an EVOH having an ethylene content of 44 mol %, a saponification degree of vinyl acetate component of 99% and an MI of 5.5 g/10 min, 25 parts by weight of ethylene-vinyl acetate copolymer having an ethylene content of 86 mol % and an MI of 6 g/10 min and 5 parts by weight of an S-EVOH having an ethylene content of 89 mol %, a saponification degree of vinyl acetate component of 91% and an MI of 5.3 g/10 min. The blend thus obtained, an ethylene-vinyl acetate copolymer having a vinyl acetate content of 8% by weight and an adhesive resin comprising a maleic anhydride-modified ethylene-vinyl acetate copolymer containing 20% by weight of vinyl acetate and 0.5% by weight of maleic anhydride were separately fed to 3 extruders and co-extrusion was conducted through a 3-kind/5-layer die to obtain a multi-layered tube having a total thickness of 350μ and a capacity of 250 ml and consisting of an intermediate layer of this blend having an average thickness of 20μ, surface layers of the polyethylene having a thickness of 150μ and provided on both sides of the intermediate layer, and the adhesive resin layers having an average thickness of 15μ and interposed between the intermediate layer and the surface layers. The central body of the obtained tube was cut to give a ring having a width of 15 mm, which was then tested with a loop stiffness tester, to show a repulsive force when pressed by 10 mm of 650 mg.

COMPARATIVE EXAMPLE 10

Example 11 was repeated except for using only the EVOH having an ethylene content of 44 mol %, a saponification degree of vinyl acetate component of 99% and an MI of 5.5 g/10 min for the intermediate layer, to obtain a tube. The same loop stiffness test as that in Example 11 was conducted, to show a repulsive force of 1,500 mg.

EXAMPLE 12

A blend was obtained by blend pelletizing through an extruder 70 parts by weight of an EVOH having an ethylene content of 44 mol %, a saponification degree of vinyl acetate component of 99% and an MI of 5.5 g/10 min, 25 parts by weight of ethylene-vinyl acetate copolymer having an ethylene content of 86 mol % and an MI of 6 g/10 min and 5 parts by weight of an S-EVOH having an ethylene content of 89 mol %, a saponification degree of vinyl acetate component of 91% and an MI of 5.3 g/10 min. The blend thus obtained, a polypropylene resin having an MI (230° C.) of 0.5 g/10 min and an adhesive resin of a maleic acid-modified polypropylene (ADMER QF-500, made by Mitsui Petrochemical Industries, Ltd.) were fed to separate extruders to conduct 3-kind/5-layer co-extrusion molding to obtain a sheet consisting of an intermediate layer (B) of this blend having a thickness of 140μ, surface layers (A) of the polypropylene resin provided on both sides of the blend layer and having a thickness of 140μ and the adhesive resin layers (C) interposed between the blend layer and the polypropylene layers and having a thickness of 60μ. (A) was extruded through an extruder equipped with a single screw having a diameter of 65 mm and an L/D of 22 at 200° to 240° C., (B) through an extruder equipped with a single screw having a diameter of 40 mm and an L/D of 26 at 170° to 210° C., and (C) through an extruder with a single screw having a diameter of 40 mm and an L/D of 22 at 160° to 230° C., and all the above melts were joined through a feed block type die having a width of 600 mm at 240° C. into the multilayered sheet having a thickness of 1960μ. The sheet thus obtained was formed by known thermoforming process into a cup of open-end diameter of 7.5 cm and drawing ratio of 1:2. The obtained cup was filled with water and heatsealed with a lid. The cup with the contents was allowed to stand at 5° C. for 3 hours, and then dropped from the height of 2 m onto a concrete floor three times. The cup did not break, showing a high resistance to falling shock.

COMPARATIVE EXAMPLE 11

Example 12 was repeated except for using only the EVOH for the intermediate layer, to obtain a cup. The cup broke, when subjected to the same falling test, at the first falling.

Obviously, numerous modifications and variations of the present invention are possible in light of the above teachings. It is therefore to be understood that within the scope of the appended claims, the invention may be practiced otherwise than as specifically described herein.

What is claimed is:

1. A resin composition comprising:
   (A) 60 to 95% by weight of an ethylene-vinyl acetate copolymer having an ethylene content of 20 to 65 mol % and a saponification degree of vinyl acetate component of at least 96%,
   (B) 4.5 to 39.5% by weight of an ethylene-vinyl acetate copolymer having an ethylene content of 60 to 98 mol %, and
   (C) at least 0.5% by weight of a saponified product of an ethylene-vinyl acetate copolymer having an ethylene content of 68 to 98 mol % and a saponification degree of vinyl acetate component of at least 20%,
   the incorporation ratio of (C) based on the sum of (B) and (C) being not more than 38% by weight.

2. A multilayered structure comprising at least 2 layers including a layer of a composition according to claim 1.

* * * * *